United States Patent [19]

Turner

[11] Patent Number: 4,529,297
[45] Date of Patent: Jul. 16, 1985

[54] DAYLIGHT ENLARGER

[75] Inventor: George F. A. M. Turner, Ingatestone, England

[73] Assignee: Ciba-Geigy AG, Basle, Switzerland

[21] Appl. No.: 510,701

[22] Filed: Jul. 5, 1983

[30] Foreign Application Priority Data

Jul. 7, 1982 [GB] United Kingdom ............... 8219620
Jan. 14, 1983 [GB] United Kingdom ............... 8300989

[51] Int. Cl.³ .............................................. G03B 13/28
[52] U.S. Cl. ....................................... 355/45; 355/60; 355/74; 354/308
[58] Field of Search ....................... 355/45, 60, 21, 27, 355/74, 18, 44; 353/75–77, 101; 354/308

[56] References Cited

U.S. PATENT DOCUMENTS 1,808,274  6/1931  Webster ............................... 355/71
1,894,004  1/1933  Rose ..................................... 355/45
3,890,043  6/1975  Pramstraller ......................... 355/62
4,053,219  10/1977  Damm et al. ........................ 355/27
4,452,527  6/1984  Turner et al. ........................ 355/45

FOREIGN PATENT DOCUMENTS 2847187  6/1979  Fed. Rep. of Germany .
1300965  7/1962  France .

Primary Examiner—L. T. Hix
Assistant Examiner—Della J. Rutledge
Attorney, Agent, or Firm—Harry Falber

[57] ABSTRACT

In a daylight enlarger of the fixed focus type which comprises an enclosed image forming area having two arm-holes which allow an operator's hands to enter this area there being present a lamphouse and transparency holder placed above the image framing area but outside the enclosed area and an enlarging lens in the transparency holder there being present in the transparency holder between the transparency and the enlarging lens a movable inclined mirror which in a first position when the lamphouse is operating with a transparency in the holder reflects an erect illuminated image of the transparency away from the enlarger so that it can be viewed by the operator of the enlarger, but which in a second position is moved from beneath the transparency so allowing the illuminated image of the transparency to fall on the image framing area, there is provided means manually controllable from inside the enclosed image forming area of the enlarger to cause the inclined mirror to be moved out of the path of the light which passes through the transparency to the enlarging lens and thence to the image projection area so enabling print material present in the image forming area to be exposed.

3 Claims, 3 Drawing Figures

DAYLIGHT ENLARGER

This invention relates to daylight photographic enlargers of the fixed focus type.

Photographic enlargers are a comparatively expensive item for a person wishing to start printing their own negatives or for schools when a number of enlargers are required for practical use by a class. One of the more expensive parts to manufacture in a conventional enlarger is the mechanism required to adjust the focus of the enlarging lens to enable different enlargements of an area of the negative to be printed. However for a person starting out in photography or for a school it is perhaps more important to provide a cheap enlarger by use of which standard enlargements from a standard negative can be produced than a much more expensive enlarger whose capabilities are much greater but which are unlikely to be exploited. Thus a number of fixed focus enlargers have been introduced on to the market to supply the demand for such inexpensive enlargers. Usually these enlargers consist of a light-tight frame or box-like structure which encloses the image-framing area. Mounted on the box are a transparency holder having the enlarging lens beneath it and mounted on the transparency holder is the lamphouse. In such a construction the distance of the lens from the image framing area is fixed. The optical characteristics of the lens is often so chosen that when a standard 35 mm transparency (negative) is present in the transparency holder the size of the projected image of the image framing area is en-print size that is to say 8.9 mm by 12.7 mm.

However with a number of such enlargers it is difficult to see clearly the illuminated image in the image framing area because the enclosure obscures the view. Also daylight enlargers of this type sometimes have arm-holes in the enclosure into which the operator's arms are placed to position the print material before exposure and to place it in a light-tight receptacle after exposure. Usually however it is required that the arm-holes have arms in them to render the enclosure light-tight. Thus it is difficult to arrange for the exposure of the material to be carried out.

In U.S. Pat. No. 4,053,219 a daylight enlarger is shown but which is not of the fixed focus type. The light-tight enclosure of this enlarger comprises two arm-holes, one of which ends in a glove so that the arm can be withdrawn without allowing ingress of light. Focusing of the enlarger and exposure of the print material is carried out by use of the arm which can readily be withdrawn from the enlarger. However two arms are required to be present in the enclosed area of the enlarger when print material is placed in the image projection area and when the exposed print material is placed in the processing cylinder.

In German O.L.S. No. 2847187 there is described a daylight enlarger wherein two means are provided for viewing the image from outside the enlarger. In one means a pivotable mirror is provided between the enlarging lens and the projected image area, the mirror reflects light to a screen on the outside wall of the enlarger, but is removed from the path of the projected image when the print material is being exposed. In the other means a pivotable mirror is provided between the transparency and the enlarging lens. When this mirror is in one position it directs a real image of the transparency to the operator outside the enlarger whilst in the other position it is removed from the path of light which passes through the transparency to the enlarging lens. However the enlarger of O.L.S. No. 2847187 is not a fixed focus enlarger and electromechanical means is provided to effect the exposure. Mechanical means are provided also to place the print material in the exposure area and to remove it from this area after exposure. Thus no arm-holes are required in the enclosed area of the enlarger.

It is the object of the present invention to provide a daylight-enlarger of the fixed focus type having arm-holes in the enclosed area in which an erect image of the illuminated transparency is clearly visible and in which exposure of the print material can be effected without removal of an arm from the arm-holes.

Therefore according to the present invention there is provided a daylight enlarger of the fixed focus type which comprises an enclosed image forming area having two arm-holes which allow an operators hands to enter this area there being present a lamphouse and transparency holder placed above the image framing area but outside the enclosed area and an enlarging lens in the transparency holder there being present in the transparency holder between the transparency and the enlarging lens a moveable inclined mirror which in a first position when the lamphouse is operating with a transparency in the holder reflects an erect illuminated image of the transparency away from the enlarger so that it can be viewed by the operator of the enlarger, but which in a second position is moved from beneath the transparency so allowing the illuminated image of the transparency to fall on the image framing area, together with means manually controllable from inside the enclosed image forming area of the enlarger to cause the inclined mirror to be moved out of the path of the light which passes through the transparency to the enlarging lens and thence to the image projection area so enabling print material present in the image forming area to be exposed.

The accompanying drawings will serve to illustrate the invention.

In all the figures the same numbers have the same signification.

Figure 1:
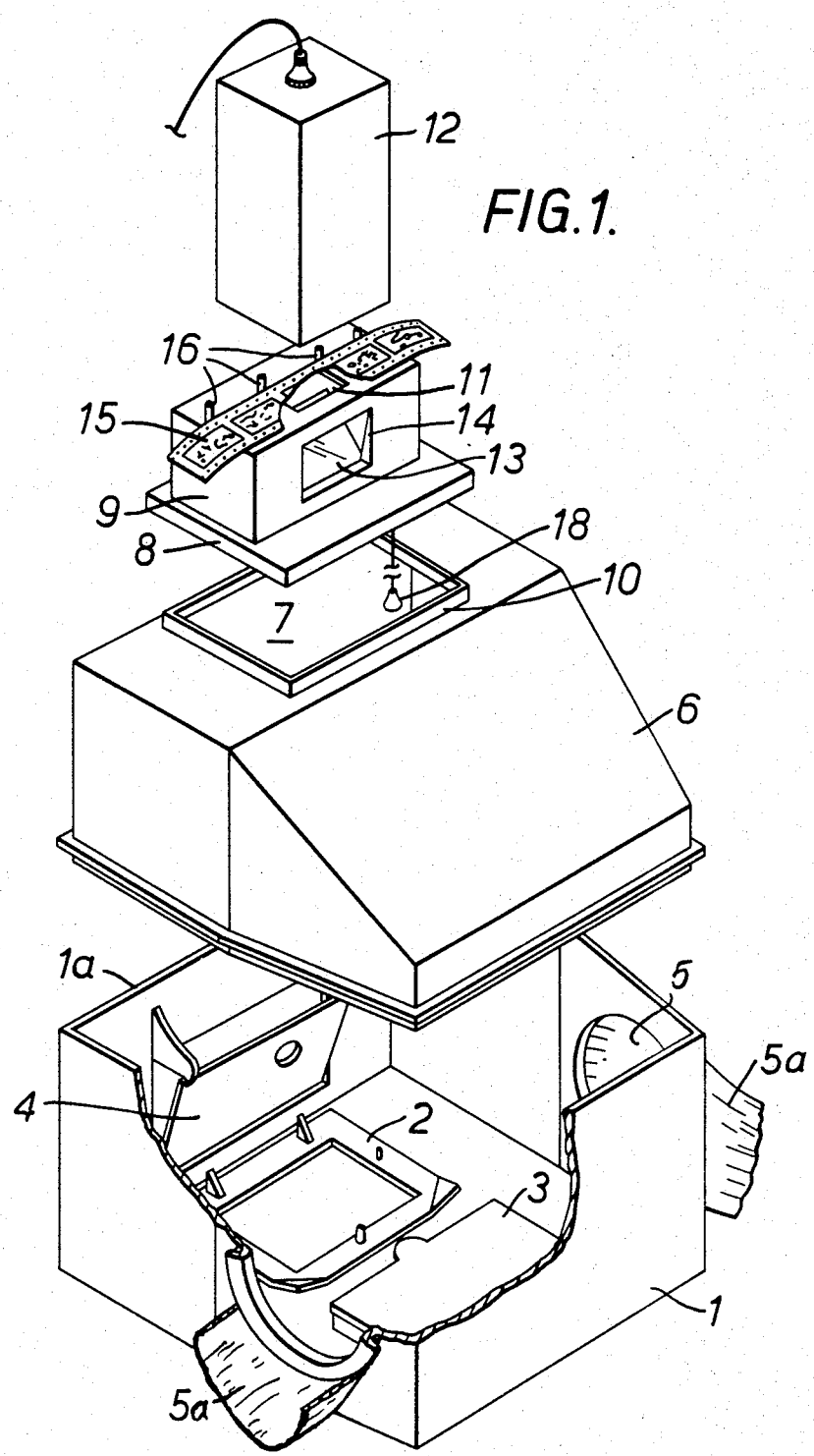
FIG. 1 is an exploded perspective view of an enlarger according to the present invention.

In FIG. 1 the enlarger comprises a light opaque lower box 1 which has mounted on the floor a liftable frame 2 and a paper safe 3.

Mounted in an aperture 5 in the two side walls are two light-excluding arm-holes 5A. Mounted on the back wall 1a is a slot means 4 connected to an external processing dish (not shown) through which exposed print material can be passed to the processing dish in a light-tight manner.

Shown above the box lower box 1 is an upper box lid 6 which is composed of red dyed polystyrene. Lid 6 fits on to box 1 in a light-tight manner.

Present on the top lid 6 is an aperture 7 over which fits a flange 8 attached to a removable transparency holder 9.

Present on the top of the transparency holder 9 is a light aperture 11 through which light from the removable lamp holder 12 is directed. Present below the light aperture 11 is an inclined mirror 13 (shown in the inclined position) in an aperture 14. On top of the transparency holder 9 there is shown a strip of 35 mm negative film 15 (in fragmentary form to show the light aperture beneath it).

Behind the strip of film is a row of film edge locating pins 16.

Figure 2:
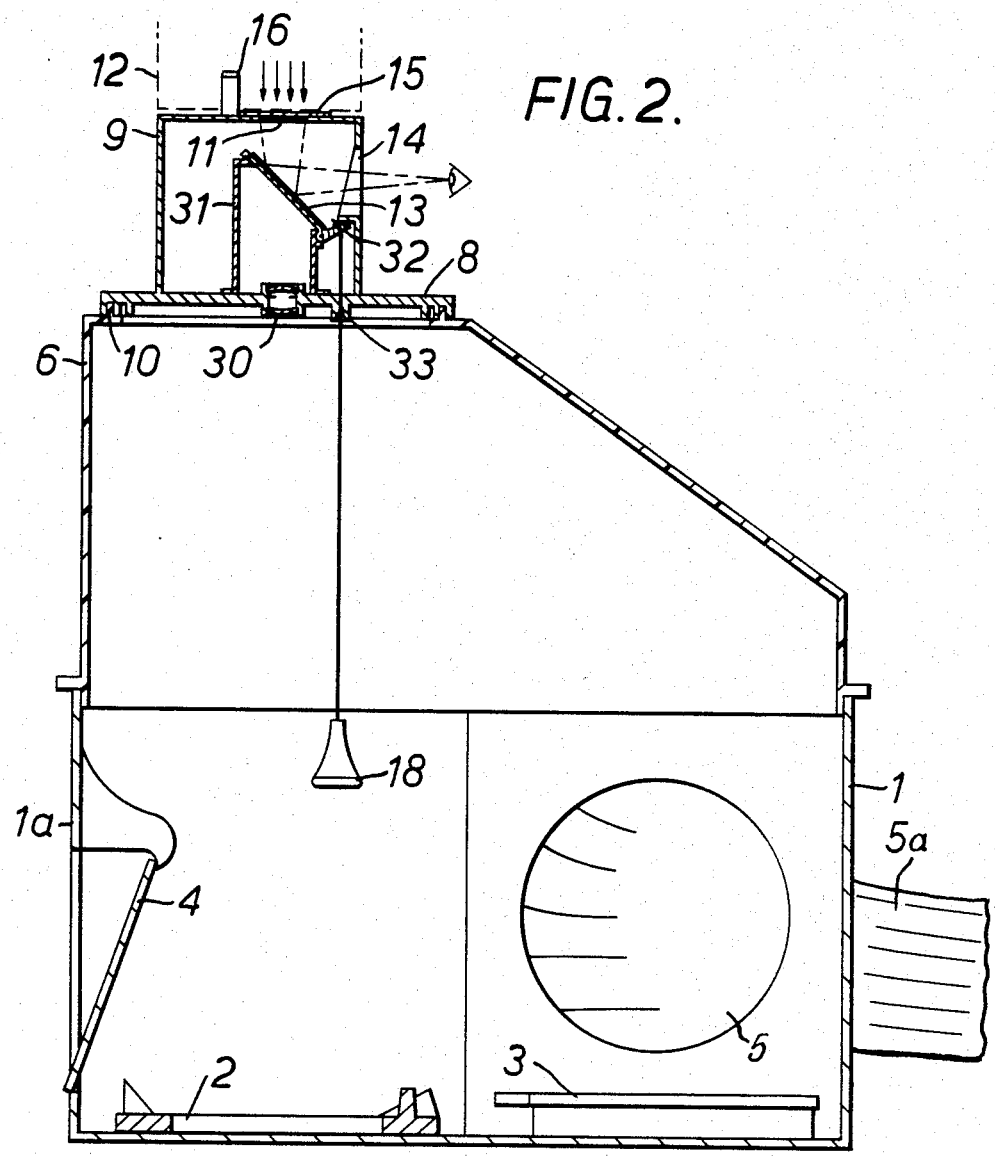
FIG. 2 is a sectional side elevation of part of the enlarger of FIG. 1 showing the mirror in the inclined viewing position.
Figure 3:
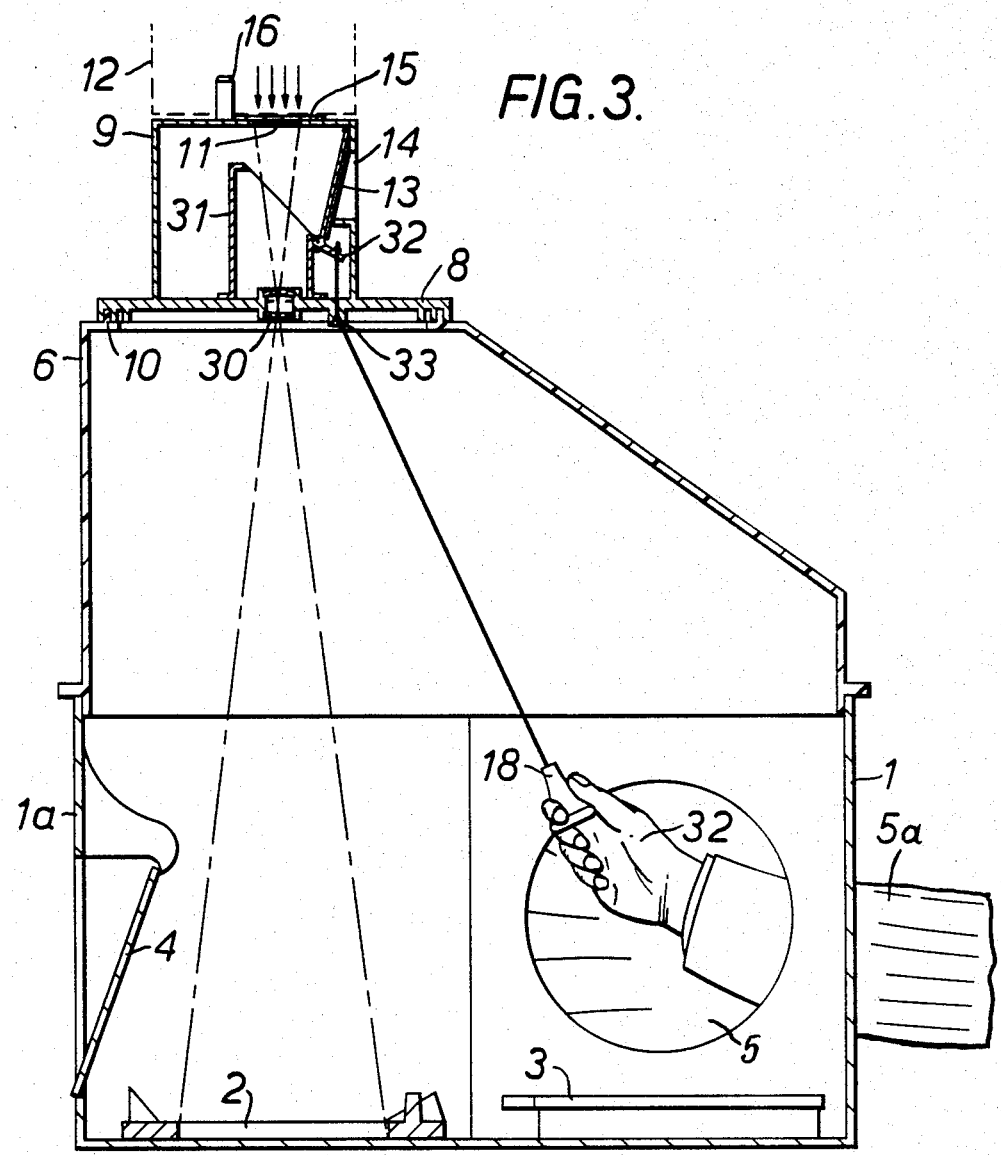
FIG. 3 is the same view as FIG. 2 but with the mirror in the exposing position.

Suspended from the transparency holder 9 is a draw cord 18 which acts to move the mirror 13 out of the path of the light (as shown in FIGS. 2 and 3).

Flange 8 of holder 9 fits over flange 10 on top of lid 6 (as shown in FIGS. 2 and 3).

There is also shown in FIGS. 2 and 3 an enlarging lens 30 located on the floor of the holder 9.

A support frame 31 supports the inclined mirror 13 in the inclined position.

The draw cord 18 is shown attached to a spring-loading pivoting member 32. The string of the draw cord 18 passes through aperture 33 in the floor of the holder 9.

In FIG. 2 there is shown a transparency 15 over the aperture 11 with the lamp in lamphouse 12 switched on. The mirror 13 is shown in the inclined position so that light from the lamphouse after passing through the transparency is reflected to the operator outside the enlarger via the aperture 14.

In FIG. 3 the draw cord 18 has been pulled down by an operator's hand 32. This causes the mirror 13 to move out of the way of the light from lamphouse 12. Thus this light now passes through the lens 30 to form an enlarged image of the transparency of the area surrounded by the frame 2.

In one embodiment of the invention an enlarger as shown in FIGS. 1 to 3 was designed to take 35 mm negatives in the transparency holder and to project the whole picture area of this negative (3.0 cm×2.0 cm) onto an area 12 cm×8 cm (en print size) in an area surrounded by frame 2. This required that the distance between lens 30 and frame 2 was 25 cms, the distance between the lens 30 and the transparency holder 9 was 6.25 cm and the focal length of the lens 30 was 5 cms.

The enlarger can be used in full daylight. In operation there is present in safe 3 a stack of print material and there is attached externally of aperture 4 a day-light-tight processing dish the lid of the dish can be opened and a sheet of exposed print material may be passed into the processing dish. A strip of 35 mm film 15 is placed in the holder 9 and the lamp in lamphouse 12 is switched on. A real erect image of the transparency is seen by the operator reflected from the inclined mirror 13. When the operator has aligned correctly the transparency he inserts his hands through the arm-holes and then places in frame 2 a sheet of print material from safe 3 using the arm holes 5. Then still with his arms in the arm-holes he pulls a draw cord 18 for the period of time he considers is the correct exposure time. He then releases cord 18 and slips the exposed print via aperture 4 into light-tight processing dish. The print material is then processed and as is often the case one or two further exposures may be required to produce a correctly exposed and processed print.

In one modification to the enlarger of FIGS. 1 and 3 the cord 18 is not spring loaded. In this case cord 18 is pulled to move the mirror out of the path of the light but another cord (not shown) is pulled to relocate the mirror in the path of the light.

In the embodiment shown in the enlarger of the present invention the movable inclined mirror is pivotably mounted so that it can move from an inclined position in which it intercepts the light path in the enlarger to a vertical position in which it does not intercept the light path. The direction in which the mirror moves from an inclined position to a position out of the light path need not be vertical but can be in any position relative to the inclined position as long as it is not in the light path.

In fact the mirror need not be pivotably mounted as long as in the first position it is inclined and in the light path and the second position is not in the light path. Thus in one embodiment the inclined mirror is located in a slideable compartment in the transparency holder. When the draw cord 18 is pulled the whole compartment which contains the inclined mirror slides out of the light path.

I claim:

1. A daylight enlarger of the fixed focus type which comprises an enclosed image forming area having two arm-holes which allow an operator's hands to enter this area there being present a lamphouse and transparency holder placed above the image framing area but outside the enclosed area and an enlarging lens in the transparency holder there being present in the transparency holder between the transparency and the enlarging lens a movable inclined mirror which in a first position when the lamphouse is operating with a transparency in the holder reflects an erect illuminated image of the transparency away from the enlarger so that it can be viewed by the operator of the enlarger, but which in a second position is moved from beneath the transparency so allowing the illuminated image of the transparency to fall on the image framing area, together with means manually controllable from inside the enclosed image forming area of the enlarger to cause the inclined mirror to be moved out of the path of the light which passes through the transparency to the enlarging lens and thence to the image projection area so enabling print material present in the image forming area to be exposed.

2. A fixed focus enlarger according to claim 1 wherein the mirror is attached to a spring means having a hanging cord which when the cord is pulled the mirror moves.

3. A fixed focus enlarger according to either claim 1 or claim 2 wherein the mirror moves from the inclined position to a substantially vertical position.

* * * * *